United States Patent
Den Ouden

(10) Patent No.: US 8,027,405 B2
(45) Date of Patent: Sep. 27, 2011

(54) DATA COMMUNICATION USING CONSTANT TOTAL CURRENT

(75) Inventor: Josephus A. A. Den Ouden, Culemborg (NL)

(73) Assignee: NXP B.V., Eindhoven (NL)

( * ) Notice: Subject to any disclaimer, the term of this patent is extended or adjusted under 35 U.S.C. 154(b) by 1155 days.

(21) Appl. No.: 10/561,398

(22) PCT Filed: Jan. 27, 2004

(86) PCT No.: PCT/IB2004/050054
§ 371 (c)(1),
(2), (4) Date: Apr. 17, 2008

(87) PCT Pub. No.: WO2004/068781
PCT Pub. Date: Aug. 12, 2004

(65) Prior Publication Data
US 2009/0004980 A1    Jan. 1, 2009

(30) Foreign Application Priority Data

Jan. 29, 2003   (EP) ..................................... 03100181
Dec. 10, 2003   (EP) ..................................... 03104627

(51) Int. Cl.
*H04L 25/34* (2006.01)
(52) U.S. Cl. ........ 375/286; 375/257; 375/288; 375/295; 375/371; 326/86; 326/90
(58) Field of Classification Search .................. 375/286, 375/371, 295, 288, 257, 359; 326/86, 90, 326/82
See application file for complete search history.

(56) References Cited

U.S. PATENT DOCUMENTS

| | | | |
|---|---|---|---|
| 6,005,895 A | | 12/1999 | Perino |
| 6,031,847 A | * | 2/2000 | Collins et al. ................. 370/508 |
| 6,452,420 B1 | | 9/2002 | Wong |
| 7,027,522 B2 | * | 4/2006 | Pickering et al. ............. 375/286 |
| 7,142,612 B2 | * | 11/2006 | Horowitz et al. ............. 375/286 |
| 7,167,523 B2 | * | 1/2007 | Mansur ......................... 375/242 |
| 7,492,288 B2 | * | 2/2009 | Bae et al. ......................... 341/58 |
| 7,508,881 B2 | * | 3/2009 | Choi et al. .................... 375/288 |
| 7,656,954 B1 | * | 2/2010 | Lim ............................... 375/242 |
| 2002/0061072 A1 | * | 5/2002 | Pickering et al. ............. 375/295 |
| 2005/0053171 A1 | * | 3/2005 | Pickering et al. ............. 375/286 |

FOREIGN PATENT DOCUMENTS

| | | |
|---|---|---|
| EP | 0 629 068 A1 | 12/1994 |
| EP | 0 735 728 | 10/1996 |
| EP | 1 207 649 | 5/2002 |

* cited by examiner

*Primary Examiner* — Vibol Tan

(57) ABSTRACT

A data communication system, comprising at least three signal conductors and a first and a second power supply terminal, for supplying currents of mutually opposite direction to the signal conductors respectively. A driver circuit establishes respective combinations of currents through the signal conductors from a selectable set of combinations, which includes combinations with currents from the first supply terminal and to the second supply terminal, so that a sum of the currents through the signal conductors substantially has a same value for each combination and at least one of the conductors in operation does not merely function in a differential-pair relation with another one of the conductors, the driver circuit determining which of the combinations from the set are established depending on information to be transmitted.

18 Claims, 3 Drawing Sheets

DATA COMMUNICATION USING CONSTANT TOTAL CURRENT

The invention relates to a data communication system and a method of communicating data.

From U.S. Pat. No. 6,005,895 it is known to transmit data over a plurality of signal conductors. Conventionally, data has been transmitted using differential pairs of signal conductors, so as to reduce noise sensitivity and interference. During transmission of binary data via a differential pair current is drawn either from one conductor of the pair or the other, dependent on the binary value that has to be transmitted. Thus a change of current in one conductor of the pair is accompanied by an opposite change of current in the other conductor of the pair, so that the total current remains constant. Thus, the radiation field caused by transmission is weaker than the field due to an uncompensated change in current.

U.S. Pat. No. 6,005,895 also uses transmission with constant total current, but it does not use the signal conductors as pairs. The basic idea is that a set of different currents is available and that different permutations of the assignment of these currents to different signal conductors are used to encode different symbols. During reception for every signal conductor the difference with each of the currents through all the other signal conductors is detected. The set of all detection results is used to decode the transmitted symbol. As a result, the total current also remains constant, but a greater number of bits can be transmitted than in the case where the signal conductors are treated as pairs. U.S. Pat. No. 6,005,895 also permits that some of the currents are the same. This reduces the number of available symbols, since no unique difference between these currents can be measured.

The communication system of U.S. Pat. No. 6,005,895 is implemented with a set of current sources that all supply the same current and can each be coupled to different ones of the signal conductor. The signal is encoded by selection of which of the current sources are coupled to which of the signal conductors.

The communication system of U.S. Pat. No. 6,005,895 has the disadvantage that a large number of different levels is needed to provide a large code capacity. To be able to distinguish such currents these currents have to include fairly large currents, which increase power supply consumption. Furthermore a large number of comparisons is needed to decode symbols.

It is inter alia an object of the invention to provide a large number of different symbols in a communication system, requiring less power consumption to distinguish different symbols, while keeping the code balanced.

It is inter alia an object of the invention to reduce the ranges of current levels needed to distinguish different symbols.

It is inter alia a further object of the invention to reduce power supply bounce in such a system.

It is inter alia a further object of the invention to further reduce power consumption in such a system.

It is inter alia a further object of the invention to implement a simple communication protocol for transmitting multi-bit data items each with a symbol coded by a combination of currents on a plurality of signal conductors, without using coding capacity for multi-bit data items.

The communication system according to the invention is set forth in claim 1. In this system symbols are encoded on three or more signal conductors by assigning to the signal conductors combinations of currents selected from currents in positive and negative directions, i.e. currents to opposite poles of the power supply, and preferably one or more additional current levels, such as preferably zero current. Communication symbols from a set of symbols are used in which each symbol corresponds to at least one different combination of currents through the signal conductors. Preferably combinations of currents I, −I of the same amplitude and zero current through the signal conductors are used to encode the symbols to simplify detection. In general different combinations correspond to different permutations of sets of positive currents, negative currents and zero currents with the same sum current, such as permutations of a combination of currents (I,I,−I,−I) and (I,−I,0,0) on four signal conductors for example. But a greater number of levels may be used, for example I1, I2, 0, −I1, −I2.

The combinations are selected so that all combinations used for encoding different data result in the same sum of currents through signal conductors and preferably in a zero sum of currents. The combinations are not limited to combinations wherein all signal conductors are part of differential pairs, where the current in one conductor of the pair always goes up when the other goes down. When the current in one conductor goes up, the current in different ones or a combination of the signal conductors may go down, dependent on the data item that is encoded, keeping the sum of the currents constant.

A receiver part of the system measures information about the size and direction of the current that flows through the signal conductors, so that at least three current levels are distinguished and uses information about the levels that have been distinguished for the different signal conductors to decode data from the combinations of currents.

In one embodiment the communication system comprises an internal current path between the poles of the power supply, the internal current path being controlled to draw an internal current that changes in opposite direction to changes in total current to of from individual ones of the poles to the signal conductors. Thus, if a symbol is first transmitted which draws a positive current I through n (n=2 for example) signal conductors and a negative current −I through n other conductors and the symbol is followed by a second symbol which draws a current I through m conductors (m=1 for example) and a current −I through m other conductors, then the internal current changes by (n−m)*I upon change from the first to the second symbol. As a result, the total current drawn from each of the poles of the power supply remains constant, reducing power bounce problems.

Preferably, the communication system is switchable to a low power mode in which no relevant symbols are transmitted and in which the internal current is reduced substantially to zero. This saves power. Also preferably, the internal current is reduced to zero more slowly than the changes during normal transmission. This reduces power bounce noise. Preferably the internal current is reduced gradually, for example according to an RC time which is longer than a normal symbol duration during transmission.

In general use, a set of symbols of the described type does not lead to a number of different possible symbols that is exactly a power of two. Preferably, only a power of two of the possible symbols is used to encode different multi-bit data items, so that the number of symbols used is the nearest lower power of two under the total number of combinations that have the same sum of current. The remaining (spare) symbols may be used for supporting a communication protocol. For example, one symbol may be used as an idle symbol, to indicate that no data is transmitted (and that the transmitted idle symbol should not be processed as data). Preferably an idle symbol is used that corresponds to zero current from both poles of the power supply. This allows a driver from another device connected to the conductors to start driving current to the conductors without the risk of signal contention enabling a safe bi-directional interface. Also preferably, the system switches back to a low-power mode when a series of such idle symbols is transmitted. During switchback the internal compensation current is reduced to zero. Thus no current is consumed in the low-power mode. Of course the zero-power supply current symbol used during low-power transmission may also be used to encode data during normal operation (not as idle), but this requires more complex decoding.

Other spare symbols may be used for other protocol purposes, such as indicating repetition of a previous symbol, so as to ensure that the transmitted symbol always changes in order to allow clock recovery. Another spare symbol may be used as a start and/or stop symbol to signal a data content independent transition from idle symbols to normal transmission and to allow a clock recovery circuit to stabilize before data is transported.

These and other objects and the advantages of the invention will be illustrated using exemplary embodiments shown in the drawing. In the drawing.

Figure 1:
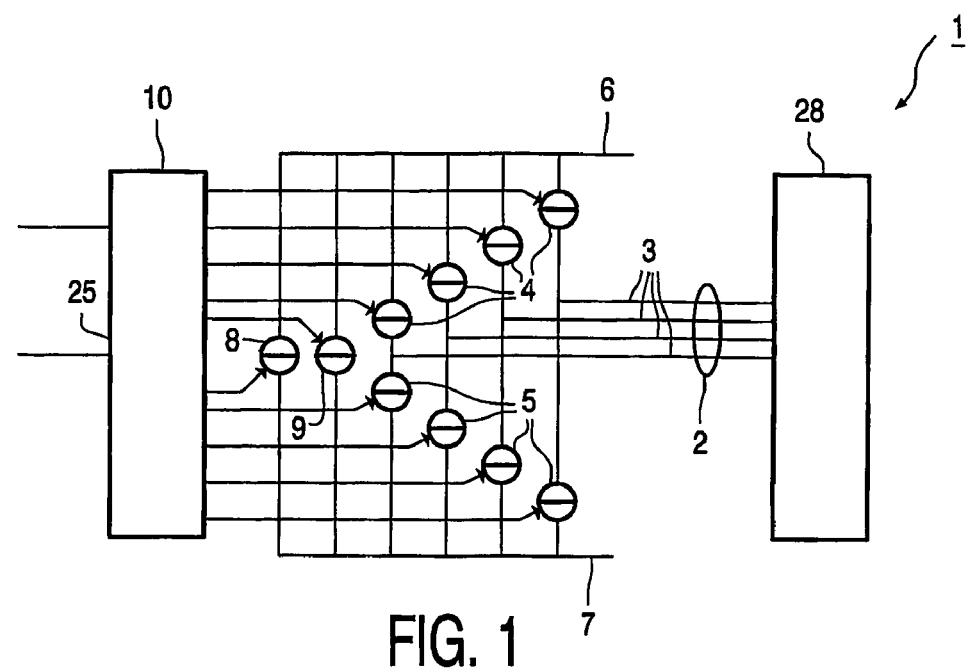
FIG. 1 shows a first embodiment of a data communication system.

In FIG. 1 a data communication system 1 is shown. Four signal conductor wires or lines 3 form a multi-wire transmission channel 2. At the receiving side of the channel 2 a receiver part 28 is connected. At the signal generating side of the channel 2, each of the conductor lines 3 is connected to both a respective positive current source 4 of a first plurality of current sources 4 and to a respective negative current source 5 of a second plurality of current sources 5. The first plurality of current sources 4 are arranged to supply a pre-specified constant positive unit current in a direction towards the conductor lines 3, while the second plurality of current sources 5 are arranged to draw the unit current directions from the conductor lines 3. The first plurality of current sources 4 are fed from a first power terminal 6 which is connected to a potential $V_S$ during use. Similarly, the second plurality of current sources 5 are fed from a second power terminal 7 which is connected to a potential $V_D$ during use. The potential difference $V_S$-$V_D$ is positive.

A pair of bypass current sources 8,9 is coupled between first and second power terminal 6,7 in parallel with current sources 4, 5. A control circuit 10 is coupled to control inputs of individual ones of the first and second plurality of current sources 4, 5 and the bypass current sources 8,9. The control circuit has an input 25 for receiving data symbols for transmission.

Control circuit 10 is arranged to establish respective patterns of currents flowing in the combination of conductor lines 3 under the control of input code signals on an input 25. Furthermore, control circuit 10 has an input for receiving a signal to indicate whether the driver should become idle (driving idle symbols only) or active and whether a valid data item is available at input. Respective patterns of currents on signal lines 3 correspond with respective data items on the input 25.

The control circuit 10 is arranged to establish successive patterns of currents in lines 3, dependent on data received at input 25, so that the sum of the currents flowing through the conductor lines 3 is substantially the same for all patterns, and preferably zero. Thereby a balanced transmission channel 2 is obtained which minimizes the Delta-I or EMI noise, i.e. electromagnetic radiation near the transmission channel due to current variation. That is, when control circuit 10 switches on or off more positive current sources 4 to transmit a symbol, it also switches on or off a same number of negative current sources 5. Control circuit may be implemented for example using a lookup table (not shown) that provides a respective pattern of control signals for current sources 4, 5, 8, 9 for each data-item value at input 25.

The sum of the currents supplied by the first plurality of current sources 4 per se, as well as the sum of the currents supplied by the second plurality of current sources 5 per se, need not necessarily remain constant over time. Only the sum of these two sums is constant. As a first example, a symbol (1102) represents a current pattern in which two of the lines 3 are free of currents (the symbol 1), a further one of the lines 3 is provided with a negative current (the symbol 0), and a yet further one of the lines 3 is provided with a positive current (the symbol 2). In this case the first current sources 4 provide only a positive current to one conductor line 3. As a second example a symbol (0202) also represents a current pattern with zero summed currents, but the first plurality of current sources 4 provide positive current to two of the conductor lines 3, which is twice the current compared with the situation in the first example.

Thus symbols (0112), (1111), (0022), as well as permutations of these symbols can be used to transmit symbols e.g. (1021), (1201) and (2101) satisfy the abovementioned restriction.

It will be appreciated that this differs from differential encoding. When two symbols differ at one position, they do not automatically differ at a fixed other position that forms a pair with that other position. This means that a larger set of symbols is available than in pure differential coding, because opposing differences are not limited to pairs of signal conductors. In differential encoding, if a particular selectable combination differs from other combinations of a subset of the set in the current through a first one of the signal conductors, then all combinations of the subset have the same current through the same complementary one of the signal conductors. In the circuit of the invention the set of selectable combinations contains at least one combination which differs from combinations of a subset of the set in the current through a first one of the signal conductors, so that the combinations of the subset differ from the symbol in the current through second ones of the conductors, the combinations of the subset not all sharing a single one of the signal conductors with the same current.

The bypass current sources 8,9 are used to realize reduction of the power supply bounce, which is the noise effect on power supply lines, caused by fluctuation of currents through power supply connections as a result of the impedance of these connections, for example the inductance of bonding wires. The reduction of the power supply bounce is obtained by keeping the current which is drawn from the first and the second power terminals 6,7 constant, using bypass current sources 8, 9 to counteract changes caused by signal current sources 4, 5. Bypass current sources 8, 9 act as an internal current sink, which sinks a current dependent on currents drawn by the current sources 4,5, so that the total power supply current remains constant, irrespective of the current pattern on lines 3.

In the case of the first example, represented by the symbol (1102), one of the positive current sources 4 provides a current to one of lines 3, while the other three positive current sources 4 do not supply a current. The control circuit 10 activates the first bypass current source 8 to deliver a positive current as well. The total current which is drawn from the first power terminal 6 is twice the amount of current drawn from the positive current sources 4.

During the transition of the situation in the first example to the situation of the second example (0202), the amount of current provided by the positive current sources 4 together is doubled and the first bypass current source 8 is deactivated by the control circuit 10, thereby keeping the current that is drawn from the first power terminal 6 constant. In the situation where no currents flow through the conductor lines 3, the control circuit 10 activates not only the first bypass current source 8, but also the second bypass current source 9 to compensate for the absence of flowing currents via the positive current sources 4.

During data transmission current patterns are provided on the respective conductor lines 3. The control circuit 10 are then operable in a transmission mode. If no data is to be transmitted the control circuit 10 operates in an idle mode transmitting an "IDLE" current pattern (1111), which is characterized by a zero net current. In this mode no substantial current flows through any of the conductor lines 3. As described above, during idle mode the bypass current sources 8,9 normally deliver a current with a double strength. If the idle mode lasts longer than a predetermined time period, control circuit 10 preferably causes the current value of the bypass current sources 8,9 to gradually reduce their current to zero. Reducing the abovementioned currents reduces the energy consumption of the transmission system. Control circuit 10 may start reducing power consumption by bypass current sources 8, 9 for example in response to a signal indicating that no valid data item is available, preferably after outputting a series of one or more stop symbols (preferably alternated with repeat symbols) to enable receiver 28 to finish processing. Control circuit 10 may start raising power consumption upon receiving a signal that indicates valid data, preferably followed by transmission of a series of one or more start symbols (and optionally repeat symbols) to enable receiver 28 to prepare for the data. For the purpose of controlling the switching between normal mode and low power mode, however, control circuit 10 may also have a dedicated control input (not shown), or control circuit 10 may contain a detector (not shown) for detecting the absence of valid data-items over a time interval longer than a predetermined period, the detector signaling the switch between modes.

When data has to be transmitted once more, control circuit 10 has to leave the idle mode. Before leaving the idle mode control circuit now causes bypass current sources 8, 9 to gradually increase their combined current to twice the unit current drawn by individual ones of the current sources 4, 5. The increase is preferably effected (much) more slowly than changes in the current during normal transmission, e.g. taking at least two and preferably more than eight normal symbol durations to increase the current from its power saving level to 90% of its required level. Upon return to the power saving mode the internal current is preferably reduced similarly in a slow way.

Figure 6:
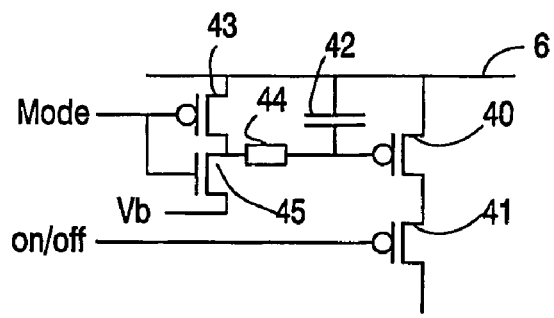
FIG. 6 shows a bypass current circuit.

FIG. 6 shows an example of a current source circuit that may be used to realize an analog gradual reduction of the current flowing through the bypass current sources 8,9 during the idle mode. In this example a bypass current source is implemented by means of a first and a second PMOS transistor 40,41, having their main current channels connected in series. The gate of first PMOS transistor 40 is connected to the first terminal 6 of capacitor 42. The gate of first PMOS transistor 40 is coupled to a source of a bias voltage Vb via, in succession, a resistive element 44 and the main current channel of an NMOS transistor 45. The main current channel of a third transistor 43 is coupled between first terminal 6 and a node between the impedance 44 and the NMOS transistor 45. The gates of the NMOS transistor 45 and the third PMOS transistor 43, as well as the gate of the second PMOS transistor 41 are controlled by the control circuit 10.

In operation, the control circuit 10 controls the second PMOS transistor 41, which acts as an ON/OFF switch for controlling which symbol is transmitted. During the transmission mode the gate of the first PMOS transistor is connected to Vb thus ensuring a constant current.

To switch from the transmission mode to the lower power mode (while IDL symbols are transmitted) the control circuit 10 makes the NMOS transistor 45 non-conductive and makes the third PMOS transistor 43 conductive, so that the gate potential of the first PMOS transistor 40 increases with an RC-time, determined by the resistive element 44 and capacitor 42, until the current through the first PMOS transistor 40 diminishes to zero.

This energy saving mode lasts until the control circuit 10 enters the transmission mode again and closes the third PMOS transistor 43, while opening the NMOS transistor 45. The potential on the gate of the first PMOS transistor 40 decreases until it reaches Vb, enabling the PMOS transistor 41 to act as a switch as described before. Of course, the energy saving circuit is not restricted to the implementation shown in FIG. 6, also other embodiments are possible.

In one embodiment, the bypass current sources 8,9 may be omitted. In this embodiment a bypass current flows through a short circuit between a positive current source 4 and a negative current source 5 that are connected to a same one of lines 3. This is achieved by the control circuit 10, which activates the corresponding first and second current sources 4,5 simultaneously. In this configuration, a bypass current flows through the connection between the positive current source 4 and the negative current source 5 via the connection with a conductor line 3. This embodiment requires fewer current sources while the effect of reducing the power bounce noise is maintained, but of course, if gradual switch-on and switch-off is required, a circuit for gradual switching on and off has to be included with at least two pairs of current sources 4, 5.

Although not shown, it will be understood that the current sources of FIG. 1 may arranged as outputs of current mirror circuits, which reflect a common basic current and additionally have been provided with a switch for switching the current on and off.

Using current sources 4, 5 for this purpose has the advantage that mismatch between bypass current sources 8,9 and current sources 4, 5 has no effect on power bounce. However, supplying current from both sides to lines 3 may slightly increase noise on lines 3.

Figure 2:
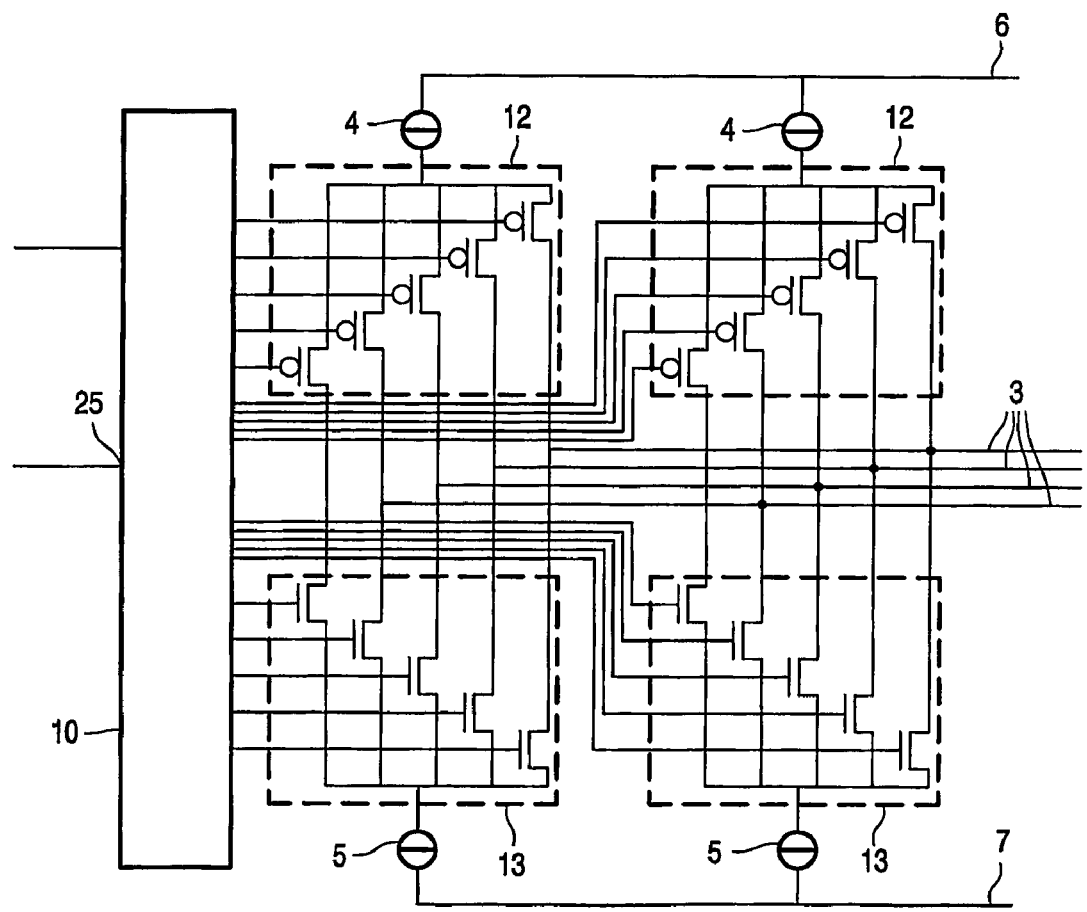
FIG. 2 shows a second embodiment of a data communication system.

A second embodiment of the data communication system 1 according to the invention is shown in FIG. 2. The first power terminal 6 is connected to two positive current sources 4, each of them connected to the four conductor lines 3 of the transmission channel 2 via a controlled five-state switch 12. Similarly, the second power terminal 7 is connected to two negative current sources 5, each of them connected to the four conductor lines 3 of the transmission channel 2 via a controlled five-state switch 13. (In fact one connection to one of lines 3 from one of each of switches 12, 13 may be omitted). Four states of the five-state switches 12,13 connect the respective current source 4,5 with the respective conductor line 3, while the fifth state connects the currents sources 4,5 with each other to form a bypass connection. The control circuit 10 controls the switches 12,13.

During use, the control circuit 10 generates a current pattern on the conductor lines 3 by coupling the respective lines 3 with the respective positive and negative current sources 4,5. This is accomplished by selecting appropriate states of the five-state switches 12,13. In the transmission mode the system allows a maximum of two positive currents and two negative currents to conductor lines 3. Again, during transmission of symbols like (1111) and (1102) that use less than maximum current from the respective power supplies, excess current that is not supplied to lines 3 is sunk internally. For this purpose a fifth position of switches 12, 13 may be used, or a short circuit between a positive and a negative source 4,5, which situation occurs when the control circuit 10 selects an equal state of the corresponding switches 12,13. This makes the fifth state of the switches unnecessary.

When the transmitter sends IDLE symbols (1111) continuously, control circuit 10 causes the current from current sources 4, 5 to be gradually reduced to zero as in the first embodiment.

Figure 3:
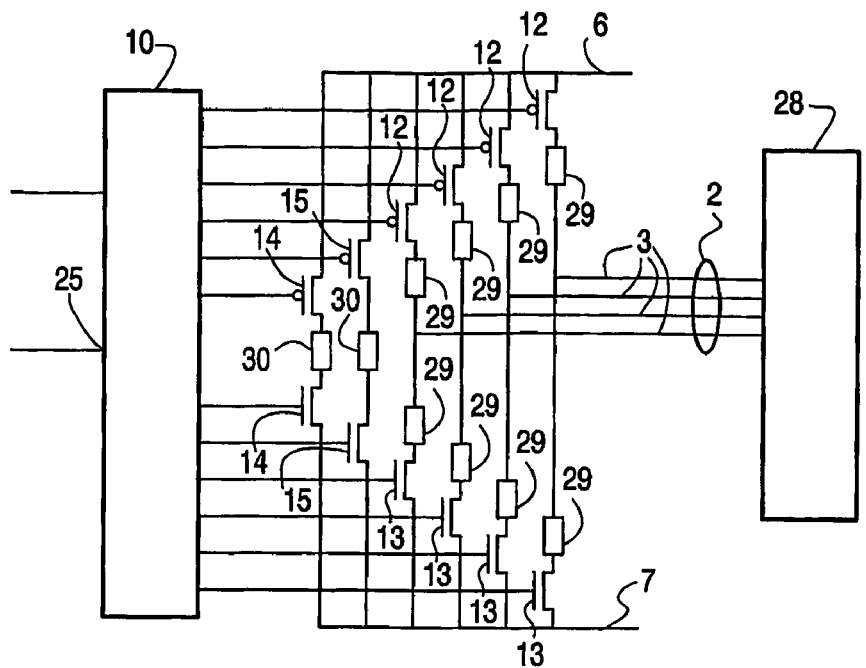
FIG. 3 shows a third embodiment of a data communication system.

FIG. 3 shows a third embodiment of the data communication system 1 according to the invention. With respect to the first embodiment the controlled positive and negative current sources 4,5 are replaced by resistive impedances 29 and controlled switches 12,13, placed in series with impedances between power supply connections 6, 7 and lines 3. Similarly, the controlled bypass current sources 8,9 are replaced by impedances 30 and controlled switches 14,15.

The first and the second power supply terminals 6,7 supply a potential which generates the desired current in each individual conductor line 3 via a termination impedance 29 of the conductor line 3, if the corresponding switch 12,13 is made conductive by the control circuit 10. Again bypass currents may be generated by a bypass network 14,15,30, shown in FIG. 3 or via a short circuit of respective switches 12,13. A bypass current of a double strength may be generated by closing both the switches 14 and 15. The impedance value $Z_0$ of the impedances 29 which may be connected to the conductor lines 3, is preferably substantially equal to the transmission line impedance of lines 3, but other choices are also possible.

The positive current in a conductor line 3 is determined by the potential difference of $V_D$ (potential at the first power supply terminal 6) and the virtual ground $V_G$ node in receiver 28 (which will be described with respect to FIG. 4) and the impedance between these nodes. A similar reasoning applies in case of a negative current in a conductor line 3, which is determined by the potential difference of $V_S$ (potential at the second power supply terminal 7) and the virtual ground $V_G$. The impedance value of the impedances 30 in the bypass network equals substantially twice the sum of the impedances $Z_0$ and the internal impedance in receiver 28, to realize a bypass current strength which is substantially the same as the currents flowing in the conductor lines 3.

When gradual switch off is desired in the IDLE mode, control circuit 10 should change the gate voltages of transistors 14, 15 gradually in the IDLE mode so as to reduce current through these transistors to zero.

Figure 4:
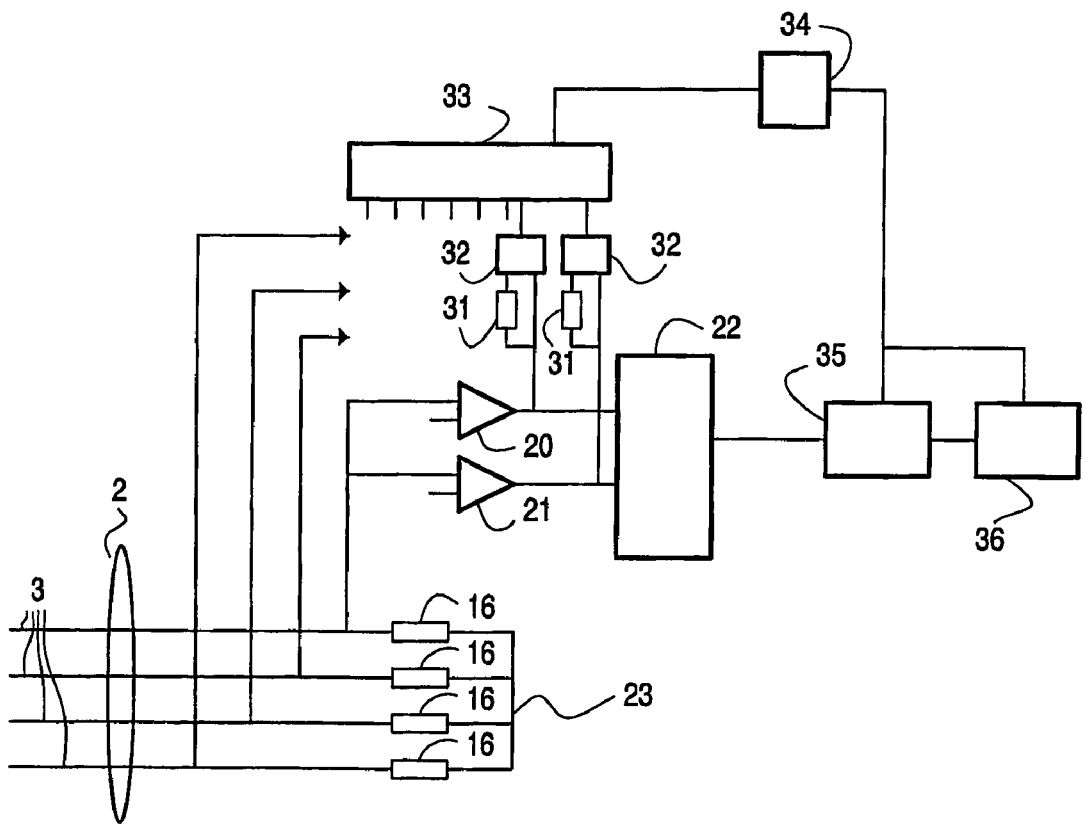
FIG. 4 shows a receiving part of a data communication system.

FIG. 4 shows an embodiment of the receiving part 28 of the data communication system 1 in more detail. Each conductor line 3 of the transmission channel 2 is connected to a virtual ground 23 via a termination impedance 16, with impedance value $Z_0$ (no coupling between virtual ground 23 and real ground is needed when the currents through lines 3 sums to zero, but of course a coupling may be provided, for example a low impedance coupling or a bleeder resistance (not shown) may be used to compensate for small deviations; the low impedance coupling is preferred when a non-zero sum of currents through lines 3 is used).

Each conductor line 3 is connected to first input terminals of two comparators 20,21 (shown only for one of lines 3 for the sake of clarity). The second input terminals 26,27 of the comparators 20, 21 are connected to reference voltages $V_1$ and $V_2$. The output terminal of the comparators 20,21 are fed to a look-up table 22 which is coupled to a memory element 35 (typically a register), which in turn is coupled to further circuits 36.

Figure 5:
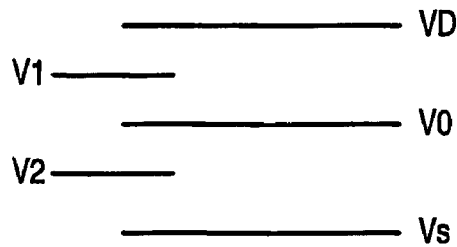
FIG. 5 shows threshold levels used in a receiving circuit.

Signal currents on each of lines 3 may assume three levels: positive unit current, negative unit current and zero current. The three-level signal current on the conductor line is detected by measuring the voltage on a line 3 by means of the first and the second comparator 20,21. As is illustrated in FIG. 5, the first comparator 20 compares the voltage with the first reference voltage $V_1$, halfway between the positive voltage $V_D$ which is obtained in case of a positive current signal and a passive voltage V0 when no current is applied to line 3. Similarly, the second comparator 21 compares the voltage with the second reference voltage, $V_2$, halfway between the negative voltage $V_S$ which is obtained in case of a negative current signal and the passive voltage $V_0$ (itself generally halfway between VD and VS).

The three-level voltage signal of each line 3 is retrieved using two comparators 20,21 per line 3. Look-up table 22 uses the signals from the comparators to generate a data signal which corresponds with the input signal which has originally been transmitted. The data signal is stored in memory element 35 and further processed by means of the further circuits 36.

A clock signal is retrieved from the data signals on lines 3. Each time the combination of currents on the different lines changes, a new clock period is detected. A change detection signal may be used directly as clock signal, but preferably a PLL is used to lock the clock signal onto the change detection signal. By way of example, a clock retrieving circuit is shown which comprises the delay element 31, an XOR gate 32 for comparator output, a multiple input gate OR 33 and a PLL 34. The outputs of each comparator are coupled to a respective XOR gate 32, directly and via a respective delay element 31. The outputs of the XOR gates are coupled to multiple input OR gate 33, which has an output coupled to PLL 34.

If the output signal of the comparators 20,21 is constant over time, the input signals of the XOR 32 are equal, and the output of the XOR 32 remains zero. If the output signal of the comparators 20,21 changes over time, the input signals of the XOR 32 differ temporarily, since delay element 31 offers a delayed signal to the XOR32, so that a detection signal is fed to the multiple input gate OR 33 and PLL 34. PLL 34 generates a clock signal locked to the phase and frequency of these detection signals. The clock signal is supplied to memory element 35 and further circuits 36 to clock operations that use data decoded from lines 3 in further circuits 36. Of course, if a central clock is available, the clock retrieving circuit may be omitted.

As explained with reference to FIG. 1 the four conductor lines 3 are arranged to permit three current states, viz. a negative current (symbol 0), no-current (symbol 1), and a positive current (symbol 2). Assuming a zero net current through the transmission channel 2, nineteen symbols corresponding to specific current patterns are allowed, viz. (2101), (2011), (1102), (1012), (1210), (1120), (2020), (0121), (1201), (2002), (1021), (0022), (0211), (0202), (2110), (0220), (0112), (2200) and (1111). From the total of 19 symbols, 16 symbols are used to encode a four-bit signal from input signals on input 25, while the remaining 3 spare codes are used as IDLE symbol (1111), STP (start/stop) symbol and RPT (repeat) symbol in a protocol. Any one of the current patterns may be used for the latter.

Figure 7:
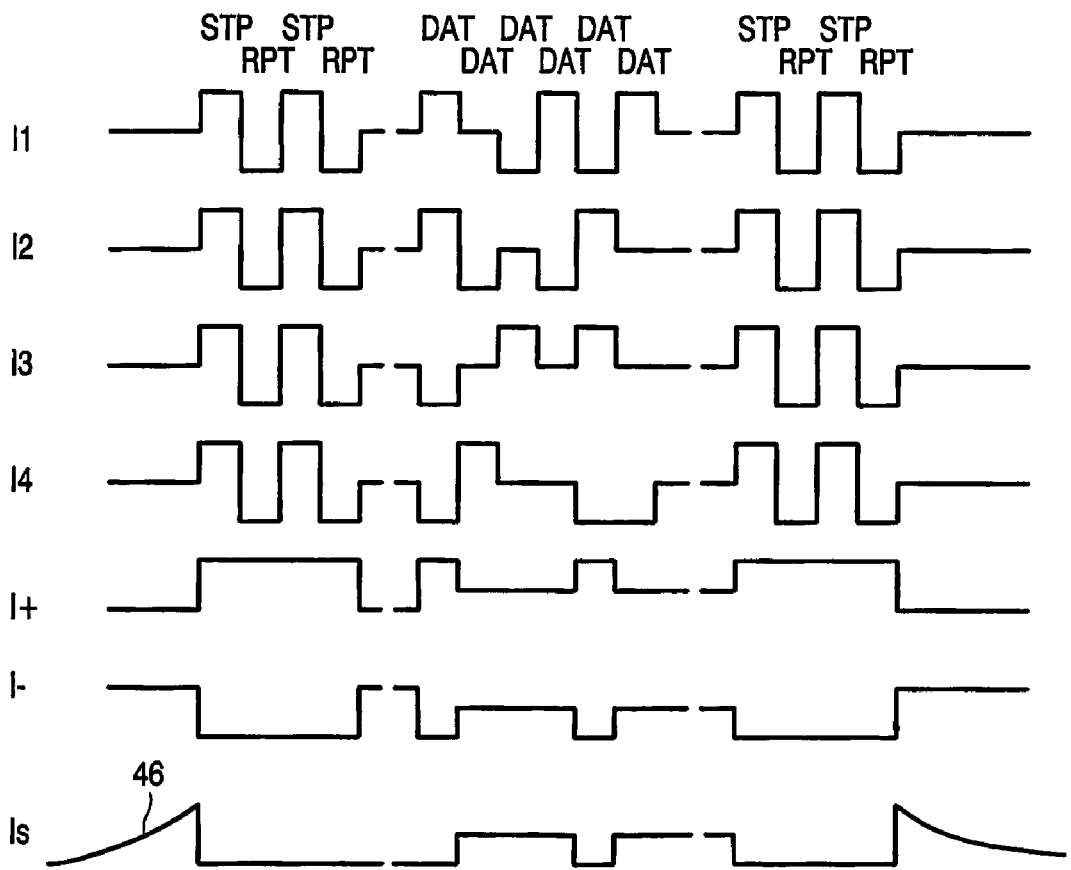
FIG. 7 shows a signals to illustrate a protocol.

FIG. 7 illustrates the protocol. FIG. 7 shows successively transmitted symbols IDL, STP, RPT, DAT, and current values on the conductor lines 3, viz. $I_1$, $I_2$, $I_3$ and $I_4$, corresponding to the symbols. The symbols DAT correspond to exemplary four-bit data input signals. Further the total current which is delivered by the positive and the negative current sources 4,5 is shown as $I_+$ and $I_-$, respectively. The positive sources 4 may deliver currents to two lines 3 as a maximum, since the net current in the transmission channel 2 is always zero. Finally, FIG. 7 shows also a sink current $I_S$.

Early on in FIG. 7 IDLE symbols are transmitted, while none of lines 3 carries current. The system is in a low power mode, in which no sink current is drawn either. As explained with respect to FIG. 6, the sink current gradually increases with a transition curve 46 when control unit detects that data has to be transmitted. Thus the system makes the transition from an energy saving situation during the idle mode to the transmitting mode. Once the sink current has substantially risen to the level of two unit currents, the system enters the transmission mode. In the transmission mode current is supplied to lines 3, dependent on the symbol being transmitted, but the total power supply current remains constant because first the control circuit 10 controls the bypass sink current sources or the short circuits. Finally, when control circuit 10 detects that no further data has to be transmitted for the time being, the system enters the idle mode again and the sink current is gradually diminished.

As already indicated, the symbol (1111) is used as a protocol idle symbol IDL which serves as an indicator for the no-transmission or idle mode. A special protocol repeat symbol RPT, corresponding with another remaining spare symbol, is introduced that is used if successive four-bit input signals are identical. Transmission of a repeat symbol indicates that the previously transferred symbol is to be repeated in the receiver. As a result, subsequent symbols will always be different, which makes it easy to recover the clock from the data stream at the receiver side.

The third remaining spare symbol is a protocol stop symbol STP, which is transmitted to indicate that transmission will start after IDLE symbols are sent or has been completed before IDLE symbols are sent. Preferably, a series of alternate STP and RPT symbols is sent before transmission of data, to allow clock recovery at the receiver part 28 to stabilize. Before entering the IDLE mode after transmission, a series of STP/RPT pairs of current patterns is preferably transmitted, to enable receiver part 28 to finish processing the received data. However, it is also possible to stop transmitting non-idle symbols immediately.

A bus system incorporating all of the above is the 4 bits binary to 4 bits ternary (Inter IC Quad wire bus: $I^2Q$). $I^2Q$ is a bi-directional bus and/or chip-to-chip signaling protocol that is designed from the beginning for speed, an optimal EMC performance by enforcing constant current and moderate power consumption. It derives from the five fundamental principles already discussed above:

(a). Maximum performance requires that both near- and far-end reflection coefficients be minimized. Therefore, both near and far-end impedances must closely match the line impedance.

(b). The sum of the signals transferred is constant. The data representation is a combination of differential and balanced coding. As such, the sum of currents transferred between the ICs is ZERO, resulting in minimal ground and peripheral supply bounce.

(c). For reasonable power consumption and sufficient noise margin, the signal swing should be as small as is consistent with receiver performance. The minimum swing needed for receiver performance shall be the $V_T$ voltage of the input transistors used plus the required noise margin as minimum. As a result, the signaling protocol is independent of the positive supply.

(d). An integrated small reference (band-gap) voltage, $V_{TT}$, shall used be fixed to commonly half the peripheral supply voltage and therefore peripheral supply voltage independent.

(e). With the differential signals and the balanced coding, the two spare codes are used to allow synchronization of the clock recovery circuitry at the receiver's side. The clock is incorporated by the repetition code RTP and a start/stop code STP Item (a) demands shunt termination though driving with current sources. Item (b) secures the data transmitted between the ICs by minimizing EM radiation. No data dependent peripheral supply consumption will occur. Furthermore, the bus can be put in idle mode that minimized power consumption effectively. Asynchronous modes are allowed as the clock is embedded with the data. Item (c) and (d) rule out the positive signal supply which leaves $V_{TT}$ as the current-less termination potential. Combined with (a) this allows a signal swing between ground and the output supply, which is consistent with (c). As an added benefit, this simplifies CMOS differential receivers because they need simple N- and P-transistors of which their $V_T$-s are used as threshold level compared to $V_{TT}$. Item (e) allows asynchronous interface designs as the clock is embedded with the data by a repetition code.

An advantage of $I^2Q$ is that variations in the peripheral supply and ground current are unlikely to occur with this protocol even at maximum performance due to its coding. For this reason, $I^2Q$ can be used advantageously with other DC-balanced data groupings such as 4B/6B and differential (1B/2B) codes. Furthermore it should be noted that the idle mode greatly simplifies hot-insertion systems.

Below the input, output, and termination specifications for differential signaling in the $I^2Q$ environment are discussed. Nominally the signaling is between 0 and 2.5 volt while maintaining constant supply current during operation. Power supplies other than the nominal 2.5 volt power for the $I^2Q$ interface are also possible.

$I^2Q$ is a balanced coded differential current driven but voltage-based signaling protocol. The nominal low level; $V_{OL}$ (ground), the intermediate level; $V_{TT}$ 1.25 V and a nominal high level; $V_{OH}$ of 2.5 V are defined.

Because the driver impedance must be matched to the line and termination impedances, this requires a nominal 2.5 V peripheral power supply (VDDQ). $I^2Q$ comprises three primitive types: drivers, receivers and terminators. A practical $I^2Q$ system must have at least one of each type, although it is possible and in fact quite practical for all three to be located at separate nodes (to allow bus structures). For point-to-point connections, these types may be incorporated into a single node.

Each individual line of an $I^2Q$ driver is defined to be in one of three states:

No voltage i.e. current drive: The maximum output voltage will be $V_{TT}(1.25\,V) - V_T$ Medium voltage i.e. current drive: The output voltage will be $V_{TT}(1.25\,V)$ High voltage i.e. current drive: The minimum output voltage will be $V_{TT}(1.25\,V) + V_T$ In idle mode, the signal at the output of the driver will be {1, 1, 1, 1}. In this condition, the total current through the 4 output drivers can be ramped up, ramped down or kept constant without affecting the output signal.

An I2Q receiver is defined to be in one of three states:
The input voltage will be less or equal than $V_{TT}$ (1.25 V)$-V_T=$"0"
The input voltage will be about $V_{TT}$ (1.25 V)="1"
The input voltage will be higher or equal than $V_{TT}$ (1.25 V)$+V_T=$"2"

In idle mode, all four inputs are at {1, 1, 1, 1}.

For I²Q terminations there are two preferred options. In the first option terminations are incorporated within the drivers or receivers. This is a preferred option for point-to-point interfaces. In the second option terminations are separate from the drivers and receivers. This is a preferred option for use in a bi-directional bus concept. In either case, in active mode and assuming a homogeneous distribution of codes, the average power consumption by the termination of each line will be limited to:

$$\tfrac{1}{3}[(V_{DDQ}-V_{TT})^2/Z_0+0+(V_{TT}-V_{SSQ})^2/Z_0)]$$

In the idle mode, the data i.e. output voltage is set to {1, 1, 1, 1} and no power is dissipated at the receiver's side. At the driver's side, the current can be made zero and the voltage can be set to $V_{TT}$ as is shown in FIG. 7.

I²Q currents and impedances are specified in the context of odd-mode transmission-line impedances between 50 and 62Ω (56Ω±10%). In the interest of standardization, implementers should preferably conform to this range. For lower or higher line impedances, the currents specified herein should be scaled to satisfy the receiver's voltage requirement conditions. When the terminations are integrated with the drivers, receivers for point-to-point applications, the characteristic line impedance requirement need be met and matched with the other lines of the interface. The crosstalk between the four individual lines of the I²Q interface (or multiples thereof) is preferably be made less than 10% for each code of occurrence by choosing proper transmission line topologies. The length i.e. propagation delay of each line of the I²Q interface should be chosen equal for optimal performance.

I²Q requires only one peripheral power supply. Preferably $V_{TT}$ is generated at each driver and receiver's side as voltage reference for the ternary level. With bi-directional interfaces a single voltage reference can be used. For performance requirements I²Q systems maintain balanced currents in both the driver and terminator devices.

I²Q comprises two classes of receivers, Class I and Class II. Class I receivers compare and have no propagation path correction. Note that in thereby in most cases, the maximum bit rate per I²Q interface is restricted to 1 Gbit/s/wire. Class II receivers compare have propagation path correction. Note that in this case, the minimum bit rate per I2Q interface is at least 1 Gbit/s/wire.

I²Q comprises two classes of drivers, Class A and Class B. Class A drivers are intended for point-to-point operation, so the load seen by the driver is nominally $Z_0$. For these bi-directional applications, the driver, receiver and termination are incorporated in the devices. Class B drivers are intended for multi-drop bus operation; the load seen by them is $Z_0/2$. For these bi-directional applications, the driver, receiver is incorporated in the devices and the termination is dealt with externally. The driver's current shall be adapted to the loading requirements. By circuit topology of the switched current sources, the resulting di/dt glitches on the peripheral supply current shall not exceed 10% of the nominal supply current. The nominal supply current may be about 180 mA or alternatively about 90 mA.

For a Class A driver the typical transition time will be ≧0.3 ns. The skew in-between the 4 transitions shall be less than 0.1 ns. Note that the output voltage should remain within the specified limits relative to $V_{TT}$ for balanced loads between 50 and 62 ohms to ground. In this case, one termination will be internal i.e. the same total current will be required as with class B drivers. For a Class B driver the typical transition time will be <<0.3 ns. The skew in-between the 4 transitions shall be less than 0.05 ns. Note that the output voltage should remain within the specified limits relative to $V_{TT}$ for balanced loads between 25 and 31 ohms to ground.

A basic I²Q interface comprises a basic single channel of 4 bits/wires. It is expected that use of one or more independent 4-bit I²Q channels will provide the best data to clock skew performance, while 4-bit granularity also allows easy bus scaling. The I²Q specification for the interface can be summarized with the following rules:

1. Values of 4 binary bits are coded into balanced 4B4T code as given in table 1 below.
2. The bus is bi-directional: one agent drives, all other agents receive ("driving" code IDL).
3. While in power down or receive mode the bus is non driven (idle, code IDL).
4. Repetition of I²Q bus (non-IDL) codes is eliminated by sending repeat code (RPT) instead.
5. Receiving agents regenerate a data sampling clock from the I²Q signal edges.
6. A transaction is started by sending at least 8 stop/repeat codes (STP, RPT, etc).
7. A transactions is stopped by sending at least 8 stop codes (STP, RPT, etc).
8. During operation the I²Q IO driver supply current modulation is compensated.
9. Only one bus agent has bus control and is bus master at any time.
10. Other agents can take over bus control and become master by token passing.
11. A new bus master must wait for at least one bus IDL cycle before taking over.
12. One default (reset) master module provides a frequency reference clock for all receivers.
13. More I²Q busses when working in parallel operate independently.
14. Higher levels of protocol can be filled in according application (for the time being).

TABLE 1

Coding table for 4 binary bits to balanced 4B4T format

| Function | Symbol | 4B4T |
|---|---|---|
| Repeat | RPT | {2,1,0,1} |
| Stop | STP | {2,0,1,1} |
| Idle | IDL | {1,1,1,1} |
| "0000" | 0x | {1,1,0,2} |
| "0001" | 1x | {1,0,1,2} |
| "0010" | 2x | {1,2,1,0} |
| "0011" | 3x | {1,1,2,0} |
| "0100" | 4x | {2,0,2,0} |
| "0101" | 5x | {0,1,2,1} |
| "0110" | 6x | {1,2,0,1} |
| "0111" | 7x | {2,0,0,2} |
| "1000" | 8x | {1,0,2,1} |
| "1001" | 9x | {0,0,2,2} |
| "1010" | Ax | {0,2,1,1} |
| "1011" | Bx | {0,2,0,2} |
| "1100" | Cx | {2,1,1,0} |
| "1101" | Dx | {0,2,2,0} |

TABLE 1-continued

Coding table for 4 binary bits to balanced 4B4T format

| Function | Symbol | 4B4T |
|---|---|---|
| "1110" | Ex | {0,1,1,2} |
| "1111" | Fx | {2,2,0,0} |

The invention is not restricted to the embodiments. Many alternative embodiments are possible. For example, more or fewer than four lines 3 may be used to transmit data, always keeping the sum of the currents through the lines constant and preferably zero. Using six lines, for example, 141 different symbols are available in this way (permutations of (222000), (221100), (211110) and (111111)), and using five lines 51 symbols are available (permutations of (22100), (21110) and (11111)). Instead of a zero-sum current, a non-zero sum current may be used, but if in this case a zero-sum current on lines 3 is used in the low-power mode, a gradual transition is preferably used from a current pattern on lines 3 with a zero-sum current to a pattern with a non-zero sum current upon entering of the transmission mode. Of course, receiver 28 should treat both current patterns as idle symbols. Instead of switching between zero current, unit current in one direction and unit current in the opposite direction on each line 3, switching between a greater number of current levels may be used. Of course, this may decrease robustness against errors, because more levels have to be distinguished by the receiver. Furthermore, without deviating from the invention, the IDLE symbol may be used as repeat symbol as well, or different current patterns may be used as repeat symbols during normal transmission and during start up. However, this complicates decoding.

Optionally, control circuit 10 has a "transmit control" input to signal in advance that data has to be transmitted, i.e. that the current from bypass current sources 8,9 must be raised gradually in preparation of transmission. But of course, such a signal may also be derived from signals received at input 25. In the latter case it may be necessary to buffer some data while the current from bypass current sources 8, 9 is raised, or to use handshake signals to indicate when new data may be delivered. Input 25 may be a serial data input, but instead a plurality of signal lines may be used in parallel for input. A clock signal may be used to clock data from input 25. Preferably, there is a one-to-one correspondence between symbols at input 25 and symbols transmitted on lines 3, but without deviating from the invention, more complicated schemes may be used, for example coding only or partly changes between successive symbols, using convolution codes.

Furthermore, although a number of circuit implementations has been shown by way of example, it will be appreciated that, without deviating from the invention, other circuits may be used. For example, instead of a single driver transistor for each line, a more complicated drive circuit may be used.

Furthermore, although the invention has been illustrated in terms of a single transmitter-receiver pair, it will be understood that in fact a plurality of transmitters may be connected to lines 3 in parallel. In this case, each transmitter may start transmission when the other transmitters are sending IDLE symbols. Any known technique may be used to ensure that the transmitters are not active simultaneously, for example some form of central control, or arbitration using an arbiter circuit or arbitration on the basis of signals on lines 3. In this case, bypass current paths are preferably provided that do not run via signal conductors 2, so as to avoid that the bypass path of one transmitter short circuits currents from other transmitters.

In one example, a bi-directional system may be realized, using two combinations of a receiver and a transmitter coupled to lines 2 on each side of lines 2. In this case preferably only one set of line impedances 30 is used for both receivers.

It will be understood that the lines 3 may connect different integrated circuits that contain a transmitter and a receiver connected to lines 3 respectively, for communication between these integrated circuits, or that lines 3, the transmitter and the receiver are all included in the same integrated circuit chip, for communication inside the chip.

These embodiments are assumed to be obvious for the man skilled in the art and are considered to fall within the scope of the following claims.

The invention claimed is:

1. A data communication system, comprising:
at least three signal conductors;
a first and a second power supply terminal, for supplying currents of mutually opposite direction to the signal conductors respectively;
a driver circuit coupled between the power supply terminals and the signal conductors, the driver circuit being arranged to establish a combination of currents through respective ones of the signal conductors, the driver circuit configured to select successive combinations, depending on information to be transmitted, from a selectable set of combinations, at least three different current levels to any signal conductor being used in the set, including a current level of current to the signal conductors from the first power supply terminal and a current level of current from the signal conductors to the second power supply terminal, a sum of the currents through the signal conductors substantially having a same value for each combination in the set and at least one of the conductors for at least one of the combinations not merely functioning in a differential pair relation with another one of the conductors;
wherein at least one of the combinations of the selectable set of combinations includes more than one of the current level of current to the signal conductors from the first power supply terminal or more than one of the current level of current from the signal conductors to the second power supply.

2. A data communication system according to claim 1, wherein the driver circuit comprises an internal switchable current path for drawing current from the first power supply terminal to the second power supply terminal, the driver circuit activating the internal switchable current path depending on the combination being established, so that a first and a second net current, from the first and the second power supply terminal to the signal conductors plus the internal switchable current path respectively, each remains substantially the same upon switching between different combinations.

3. A data communication system according to claim 2, wherein the internal current path is arranged so that none of the current from the internal current path is capable of flowing to any one of the signal conductors.

4. A data communication system according to claim 2 the driver circuit being operable in a transmission mode and a low power mode, the driver circuit switching back and forth from the transmission mode and the low power mode while transmitting a combination of current with zero current through each of the signal conductors, the driver circuit making the internal switchable current path non-conductive in the low power mode.

5. A data communication system according to claim 4, wherein the driver circuit is arranged to make the internal switchable current path non-conductive with a speed so that a size of current through the internal switchable current path decreases to zero at a slower rate than during switching for different combinations in the transmission mode.

6. A data communication system according to claim 1, comprising a first plurality of current sources between the first power supply terminal and respective ones of the signal conductors and a second plurality of current sources between the second power supply terminal and respective ones of the signal conductors, the driver circuit controlling the selection of the patterns by controlling which of the current sources supply a unit current to the signal conductors.

7. A data communication system according to claim 1, the driver circuit being arranged to selectably short circuit a part of current sources from the first and second plurality with each other when one or more of the signal conductors draws no net current, so that a total current from both power supply terminals remains substantially constant.

8. A data communication system according to claim 1, comprising a receiver circuit arranged to decode the information from the currents through the signal conductors depending on detection whether the currents through the signal conductors deviate from zero and in which direction.

9. A data communication system according to claim 1, wherein each combination is selected under the control of a respective multi-bit data item, the number of selectable combinations being a power of two, further combinations of currents to respective ones of the signal conductors that have a same sum of currents as the selectable combinations being used for a signaling protocol that supports transmission of symbols that encode the multi-bit data items.

10. A data communication system according to claim 1, arranged to operate according to a protocol in which a first one of the combination of currents in which no current flows through the power supply terminals is used as an idle symbol to indicate the absence of data.

11. A data communication system according to claim 10, wherein the protocol involves transmitting a data content independent series of alternating combinations between the idle symbol and data dependent symbols.

12. A data communication system according to claim 1, arranged to operate according to a protocol wherein the protocol involves transmitting an at least partly data independent one of the combinations as a repeat symbol to indicate repetition of preceding information.

13. A method of communicating data via at least three signal conductors, the method comprising:
using currents of mutually opposite polarity from a first and a second power supply terminal respectively to establish successive combinations of currents on respective ones of the signal conductors, the combinations being selected depending on information to be transmitted, so that a sum of the currents through the signal conductors substantially has a same value for each combination and at least one of the conductors in generation does not merely function in a differential pair relation with another one of the conductors, at least three different levels of current to any signal conductor being used in the set of selectable combinations, including a current level of current to the signal conductors from the first power supply and a current level of current from the signal conductors to the second power supply;
wherein at least one of the combinations includes more than one of the current level of current to the signal conductors from the first power supply terminal or more than one of the current level of current from the signal conductors to the second power supply.

14. A method according to claim 13, wherein the sum is zero in all combinations.

15. A method according to claim 14, wherein a combination in which currents to all signal conductors being zero are used as an idle symbol.

16. A method according to claim 15, wherein a series of idle symbols is transmitted followed by changing combinations prior to the transmission of data-dependent combinations.

17. A method according to claim 13, wherein each combination is selected under the control of a respective multi-bit data item, the number of selectable combinations being a power of two, further combinations of currents to or from respective ones of the signal conductors that have a same sum of currents as the selectable combinations being used in a signaling protocol that supports transmission of symbols representing the multi-bit data items.

18. A data communication system, comprising:
at least three signal conductors;
a first and a second power supply terminal, for supplying currents of mutually opposite direction to the signal conductors respectively;
a driver circuit coupled between the power supply terminals and the signal conductors, the driver circuit being arranged to establish a combination of currents through respective ones of the signal conductors, the driver circuit selecting successive combinations, depending on information to be transmitted, from a selectable set of combinations, at least three different of current levels to any signal conductor being used in the set, including a current level of current to the signal conductors from the first power supply terminal and a current level of current from the signal conductors to the second power supply terminal, a sum of the currents through the signal conductors substantially having a same value for each combination in the set and at least one of the conductors not merely functioning in a differential pair relation with another one of the conductors;
wherein the driver circuit comprises an internal switchable current path for drawing current from the first power supply terminal to the second power supply terminal, the driver circuit activating the internal switchable current path depending on the combination being established, so that a first and a second net current, from the first and the second power supply terminal to the signal conductors plus the internal switchable current path respectively, each remains substantially the same upon switching between different combinations; and
wherein the internal current path is arranged so that none of the current from the internal current path is capable of flowing to any one of the signal conductors.

* * * * *